Oct. 21, 1958   C. W. GIBBONS, JR   2,856,806
COUPLING PIN WITH PIVOTABLE SECURING RING
Filed Feb. 8, 1957
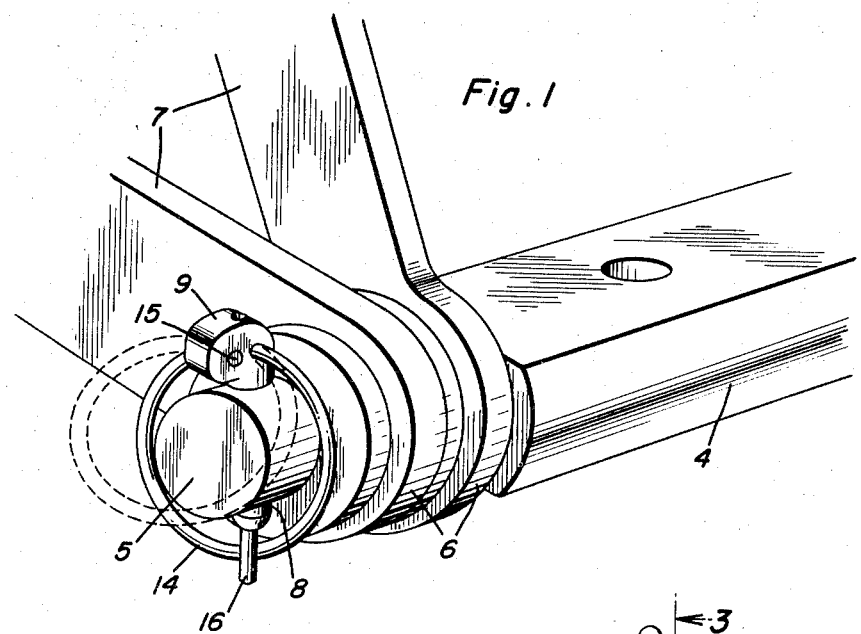
Fig. 1
Fig. 3
Fig. 2
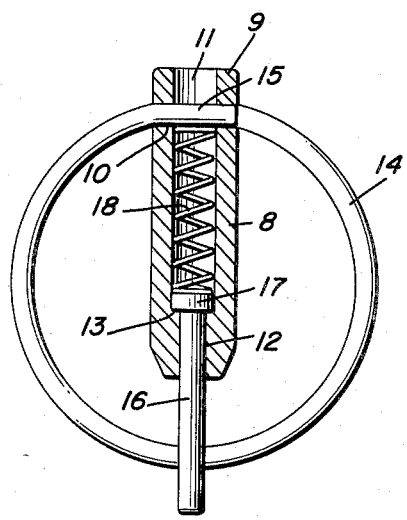
Charles W. Gibbons, Jr.
INVENTOR.
BY *[signatures]*
Attorneys

2,856,806
COUPLING PIN WITH PIVOTABLE SECURING RING

Charles W. Gibbons, Jr., Salisbury, Md.

Application February 8, 1957, Serial No. 639,164

1 Claim. (Cl. 85—5)

The present invention relates to new and useful improvements in securing pins, particularly for draw bars of agricultural or farm tractors and has for its primary object to provide, in a manner as hereinafter set forth, a device of this character comprising novel locking means whereby accidental disengagement and consequent loss of the pin with possible damage to the equipment will be positively prevented.

Another very important object of the invention is to provide a pin of the aforementioned character which, although securely locked in the draw bar, may be expeditiously removed therefrom when desired.

Other objects of the invention are to provide a draw bar, etc., securing pin of the character described which will be comparatively simple in construction, durable, compact, highly efficient and reliable in use and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view, showing a pin embodying the present invention in use;

Figure 2 is a top plan view of the device; and

Figure 3 is a vertical sectional view, taken substantially on the line 3—3 of Figure 2.

Referring now to the drawing in detail, it will be seen that reference character 4 designates a portion of a conventional tractor draw bar. The draw bar 4 includes the usual apertured reduced end portion 5 inserted through aligned eyes 6 on the links 7 of the hydraulic linkage system of the tractor.

The embodiment of the present invention which has been illustrated comprises a tubular pin 8 of suitable metal which is insertable downwardly in the opening provided therefor in the end portion 5 of the draw bar 4. The pin 8 includes, on its upper end, an outwardly projecting head 9 having a pair of parallel transverse openings 10 therein.

The innermost opening 10 intersects the bore 11 of the tubular pin 8. The bore 11 of the tubular pin 8 includes a reduced lower end portion 12 providing a shoulder 13 in said pin.

A split, coiled ring 14 of suitable resilient metal has its lapped end portions 15 journaled in the openings 10 for mounting said ring for swinging movement in a vertical plane on the pin 8.

Slidably mounted in the tubular pin 8 and adapted to project downwardly below the lower end thereof is a lock bolt 16 for the ring 14. The bolt 16 is slidable in the reduced lower portion 12 of the pin 8 and comprises on its upper end a head 17 adapted to seat on the shoulder 13. A coil spring 18 is mounted under compression in the pin 8 between the head 17 and one of the end portions 15 of the ring 14 for yieldingly urging the bolt 16 downwardly to an extended or operative position.

It is thought that the use of the device will be readily apparent from a consideration of the foregoing. Briefly, the resilient ring 14 is swung outwardly and upwardly to permit the pin 8 to be inserted downwardly in the opening provided therefor in the end portion 5 of the draw bar 4. Downward movement of the pin 8 in the draw bar is arrested by the head 9. The resilient ring 14 which has been tensioned when swung upwardly on the pin 8, is now swung downwardly and inwardly in a manner to encircle the end portion 5 of the draw bar 4. The bolt 16 is elevated against the tension of the spring 18 for permitting the lower portion of the ring 14 to pass inwardly. The bolt 14 is then released and returns to operative position in the path of the lower portion of the ring 14 thus positively locking said ring 14 against outward swinging movement. Of course, to remove the pin 8 the bolt 16 is raised and the ring 14 is swung outwardly sufficiently to clear the end of the draw bar after which said pin may be readily withdrawn.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A draw bar, etc., securing pin of the character described comprising: a tubular metallic pin removably insertable in a draw bar, said pin including a head on one end having a pair of spaced, parallel transverse openings therein, a split, coiled resilient ring mounted for swinging movement on the pin and including lapped laterally spaced apart end portions journaled in the openings and tensioning said ring for swinging into encircling relation to a draw bar for anchoring the pin therein, a bolt slidable in the pin and extending from the other end of said pin beyond the ring for locking said ring in operative position, and a coil spring mounted under compression in the pin and having one end engaged with one end portion of the ring and the other end engaged with the bolt for yieldingly urging said bolt toward extended position.

References Cited in the file of this patent

UNITED STATES PATENTS

| | | |
|---|---|---|
| 723,219 | Thorpe | Mar. 17, 1903 |
| 1,700,613 | Meigs | Jan. 29, 1929 |
| 2,759,388 | Annis | Aug. 21, 1956 |

FOREIGN PATENTS

| | | |
|---|---|---|
| 58,854 | Sweden | Mar. 20, 1925 |
| 458,153 | Germany | Mar. 30, 1928 |
| 532,113 | Germany | Sept. 17, 1930 |